June 13, 1961  G. B. WALKER  2,988,212
FULL SIZE RANGE CENTRIFUGAL HEAVY MEDIA SEPARATION
Filed Feb. 16, 1960  3 Sheets-Sheet 1

FIG. I

INVENTOR.
GODFREY B. WALKER
BY
ATTORNEY

INVENTOR.
GODFREY B. WALKER

United States Patent Office 2,988,212
Patented June 13, 1961

2,988,212
FULL SIZE RANGE CENTRIFUGAL HEAVY MEDIA SEPARATION
Godfrey B. Walker, Riverside, Conn., assignor to American Zinc, Lead and Smelting Company, St. Louis, Mo., a corporation of Maine
Filed Feb. 16, 1960, Ser. No. 8,995
5 Claims. (Cl. 209—12)

This invention relates to the separation of heterogeneous mixtures of solid particles having different densities. More particularly the invention relates to an improved process for effecting the separation by means of a medium consisting of fine, heavy solids and a liquid.

The use of suspensions of very fine, heavy solids in a liquid, usually water, as a medium for the separation of particles of different specific gravities has been practiced for many years. At first these processes were sometimes referred to as "sink and float" processes and later as "heavy media processes." In each case the particles to be separated were introduced into the medium in a suitable separatory vessel such as a cone, the heavy particles sank and the light particles floated. The sink and float fractions were then drained on a screen and finally washed on a second screen. This washing resulted in a great dilution of the medium and it was customary and necessary to restore the washings to the proper solids concentration. At the same time it was necessary to remove very fine particles which contaminated the medium. It was customary to combine a cleaning of the dilute washings with removal of sufficient water or other liquid to restore the desired solids content.

In the early years heavy media processes presented enormous difficulties in the medium cleaning step. A great advance was made just prior to 1940 by Wade and is described in the Wade Reissue Patent No. 22,191, September 29, 1942. Wade used magnetically susceptible fine solids as his medium solids, for example, magnetite or, more particularly for the beneficiation of particle mixtures such as ores of higher specific gravity, ferrosilicon. Cleaning of the magnetic medium washings was extremely simple using magnetic cleaners of high effectiveness. However, magnetic cleaning alone was not sufficient and one of Wade's great contributions lay in demagnetizing the cleaned solids so that they would not clump together in a separatory vessel by reason of residual magnetism and hence the medium in the vessel would not stratify and the clumped aggregates rapidly sink to the bottom. The Wade process made heavy media separation generally practical and was the foundation of a great heavy media beneficiation industry in the past two decades, both in the United States and throughout the world.

Heavy media was ideally suited for cheap beneficiation where the ore particles were of fair size. But it was not entirely satisfactory if too large a size range was encountered. Finer particle sizes in the feed were handled with increasing difficulty and decreasing efficiency. In general it was ordinarily desirable not to handle feed having any substantial proportion smaller than a quarter of an inch or at most 10 mesh. The beneficiation of a wide size range of material, therefore, soon became one of the serious problems which restricted the applicability of heavy media processes.

This consideration led to an improved process which is described and claimed in my prior Patent No. 2,387,866, October 30, 1945. Essentially this patent used magnetic medium solids and so was an improvement on the basic Wade process but instead of cleaning the washings from the sink product and the float product together they were cleaned separately. Each cleaning circuit was designed to operate effectively with its own material, that is to say, in the one case light fines from the float product and in the other heavy fines from the sink product. The improvement over the basic Wade process set forth in my prior patent permitted handing of a much wider size range down to as fine as 65 mesh or even finer and it extended the heavy media process to the treatment of additional classes of ores. This process, which was referred to generally in the art as "twin cleaning," used all of the elements of the Wade cleaning process, that is to say, the medium washings to be cleaned were cleaned on separate magnetic cleaners, if desired with preliminary magnetic thickening, and then the cleaned medium both from the sink and the float fractions was demagnetized and recirculated.

After the end of the second World War certain other heavy media processes were introduced using centrifugal force instead of the force of gravity to effect separation of particles of low specific gravity from those of high specific gravity. The first of these processes which throughout the remainder of the specification and claims will be referred to as "centrifugal separation" used hydrocyclones. These vessels, although possessing enormous capacity in extremely small equipment, were somewhat crude and in many cases did not effect as sharp a separation as was possible with the best heavy media processes and particularly still suffered seriously from a restriction in the size range which could be handled. This restriction was to some extent just the reverse of that encountered in heavy media processes, that is to say, the processes would not handle relatively large material and so the size range of materials which could be treated was still drastically restricted.

In later years the centrifugal separation principle was used in a different type of vessel and under greatly different operating conditions. These processes and equipment are known as "Whirlpools" or sometimes "Dyna-Whirlpools." The most modern whirlpool equipment is illustrated by the Rakowsky Patent 2,917,173, December 15, 1959. In this apparatus medium is introduced tangentially into the bottom of a vessel, usually cylindrical in shape, high density material is discharged peripherally at the top, the feed to be separated is introduced axially at the top and light particles are discharged axially from the bottom. As in all centrifugal force separation two vortices are produced rotating in the same direction but one moving axially up and the other down. The whirlpool separation was able to handle very coarse material or very fine material but the problem of effective cleaning of the medium where a very great size range of feed is treated still remained. It is with the solution of this problem in connection with centrifugal force separations that the present invention deals.

Essentially I have found that if the principle of twin cleaning was used, that is to say a separate cleaning of the washed medium from the light particles and from the heavy particles, not only is the cleaning effected satisfactorily with the wide size range as was the case in the twin cleaning process of my earlier patent above referred to when dealing with the products from sink and float heavy media processes, but when the twin cleaning is combined with centrifugal separations I eliminate one element which was essential both to Wade and to my earlier patent. Namely, I have found that it is possible to eliminate the demagnetizer or demagnetization step of the cleaned medium and no difficulties in the reuse by reason of residual magnetism are encountered. In other words, when the separate cleaning is associated with centrifugal force separations, the same improved result is obtained with the elimination of one set of equipment or one process step formerly considered necessary without eliminating its function.

The invention will be described in greater detail in conjunction with typical flow sheets using modern separatory whirlpools. It should be understood, however, that the invention is not limited to the processes using whirlpools though this combination gives optimum results, and older centrifugal force separators such as hydro-cyclones may be used in combination in the present invention.

The invention will be described in greater detail in conjunction with the drawings in which.

Figure 1:
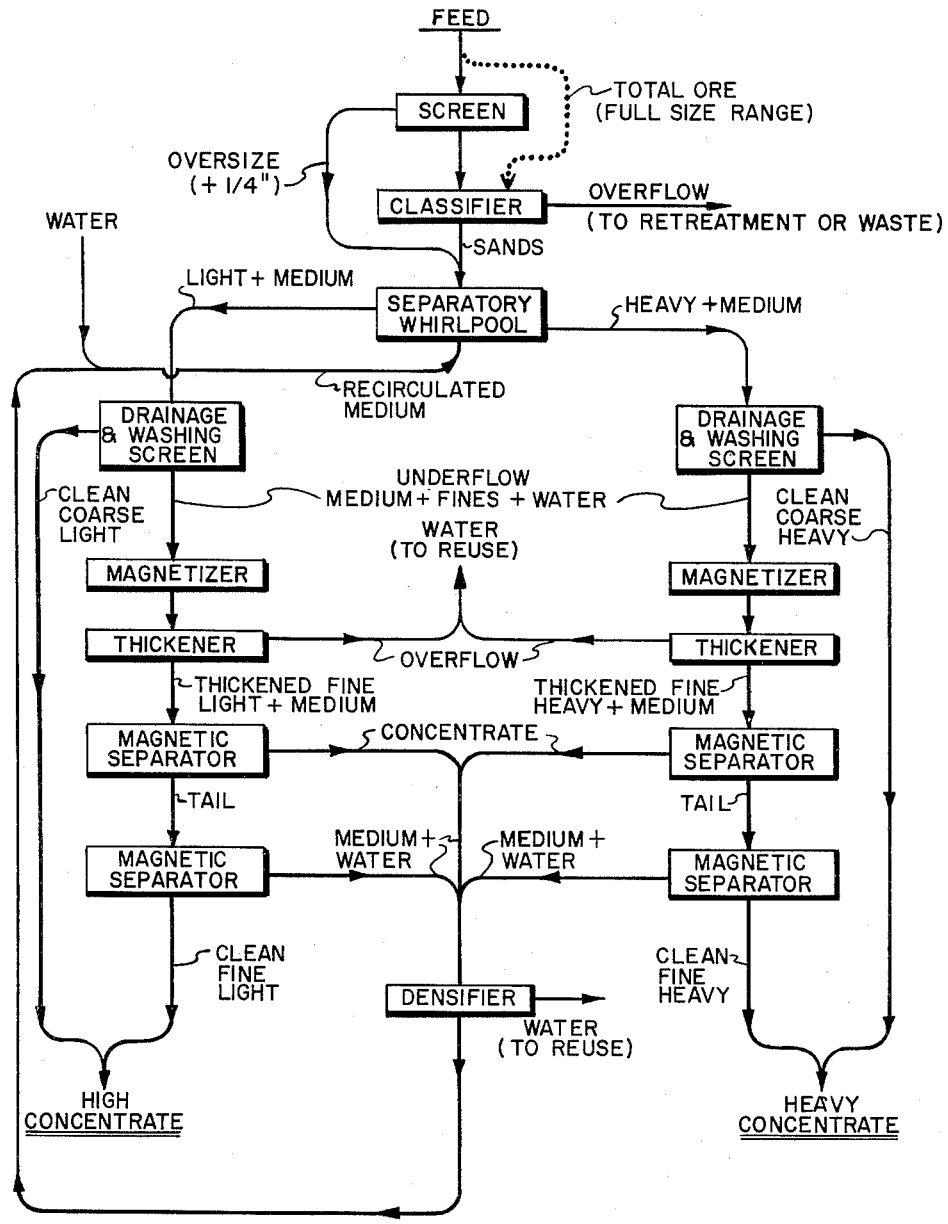
FIG. 1 is a simplified flow sheet of the basic process.

In the flow sheet shown in FIG. 1 the feed, which usually is an ore, under which designation coal or mineral mixtures is included, is classified and/or screened and the fines discarded or otherwise beneficiated. This preliminary ore treatment is conventional.

The sands which may range from large pieces, inches in diameter, down to particles as fine as 65 mesh or finer are introduced into a separatory whirlpool, for example, one of those described in the Rakowsky patent referred to above. The whirlpool effects separation under the influence of centrifugal force discharging a heavy product with medium peripherally and a light product axially. The two products with associated medium, which is a suspension of very fine magnetizable particles, are screened on separate drainage screens and are then washed on separate washing screens. The screen oversize passes on and constitutes heavy concentrate and light concentrate. The underflow from the two screens may then be magnetized and thickened and the water reused if desired. The thickened fine light and medium and fine heavy and medium then passes to separate magnetic separators. Each produces a magnetic concentrate and a nonmagnetic tail which, as is usual good practice with heavy loading, is again magnetically cleaned in a second set of separators. The fine particles from the last pair of separators are mixed with the coarse light concentrate and heavy concentrates respectively and the magnetic concentrates are densified and returned to the whirlpool with the addition of water if necessary to readjust to the desired solids content. There is no demagnetization.

In line with twin cleaning practice used with the older sink and float separations, the drainage screens are considerably coarser than the finest product which is to be recovered. If this latter is 65 mesh the screens may advantageously be of 10 mesh or even a little coarser. In these coarser sizes the efficiency of the screens is very high and they are used to maximum effectiveness. On the other hand, the magnetic separators can easily separate magnetized particles from quite fine nonmagnetic material and a good recovery and sharp separation of the finer light and finer heavy fractions is obtained.

The magnetic concentrates from the magnetic separators are shown as combined before densification. Ordinarily this is the most economical way to handle them. However, the process of the present invention operates well if the separate magnetic concentrates are directly recirculated.

Figure 2:
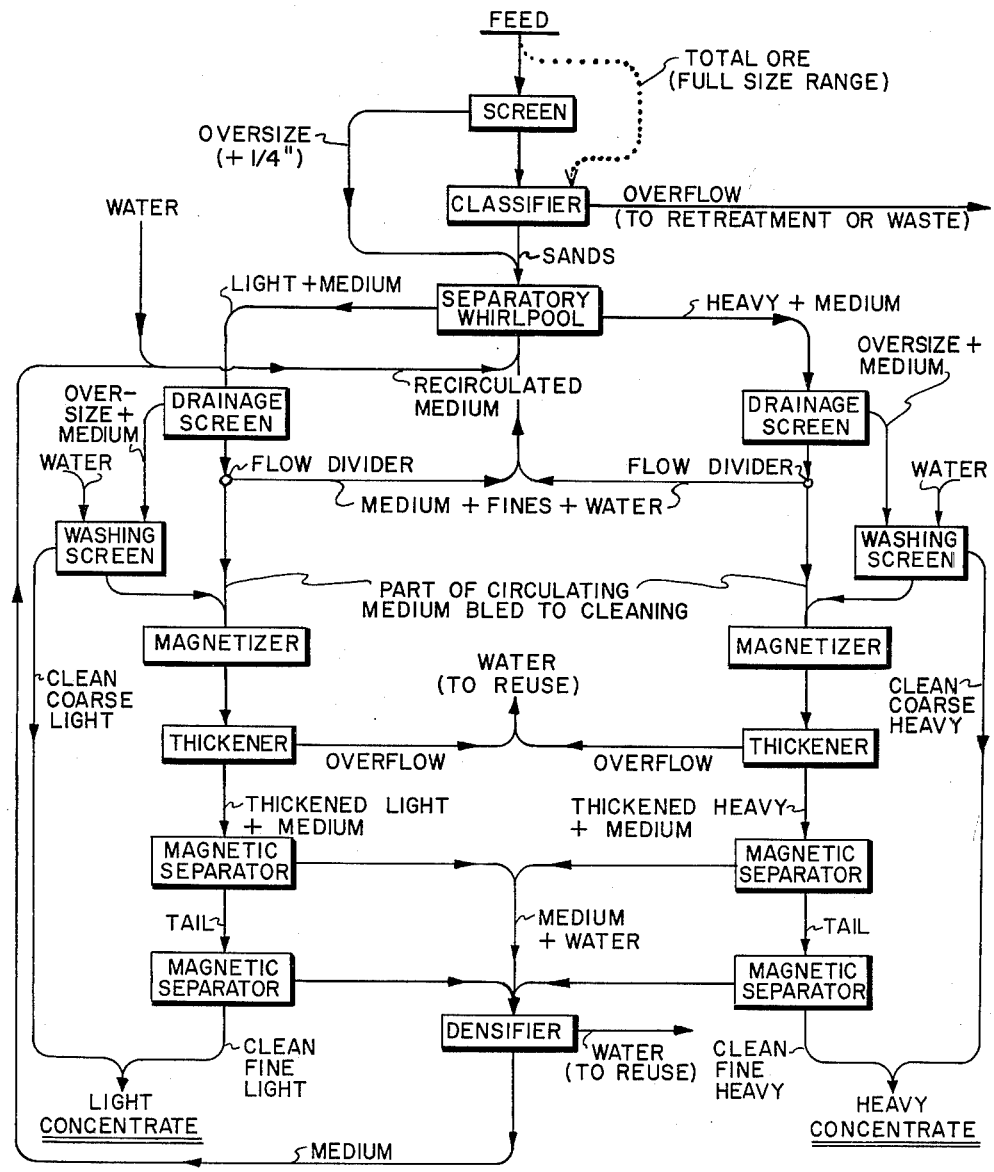
FIG. 2 is a flow sheet of a modification in which only a portion of the medium is continuously cleaned.

FIG. 2 illustrates a modification in which a portion of the medium draining through the drainage screens is recirculated through the whirlpool. It is true that this recirculating material does contain fine light and fine heavy but it reduces the volume which has to be cleaned. If the amount of fine material in the feed is not excessive this constitutes a desirable economic compromise because while some material is passed again through the whirlpool the cost of the small additional size of whirlpool is much less than the additional magnetic separators which are needed to handle the full volume of the medium drained and washed.

It will be noted in FIG. 2 that there are provided flow dividers which direct a portion only of the medium drained from the drainage screen back to the separatory whirlpool. In practice it is often desirable to make these dividers adjustable to compensate for varying amounts of fines from day to day in the feed treated. The present invention is in no sense limited to the exact amount which is recirculated. This is determined in line with good operating procedure to obtain the best results from the equipment available.

Figure 3:
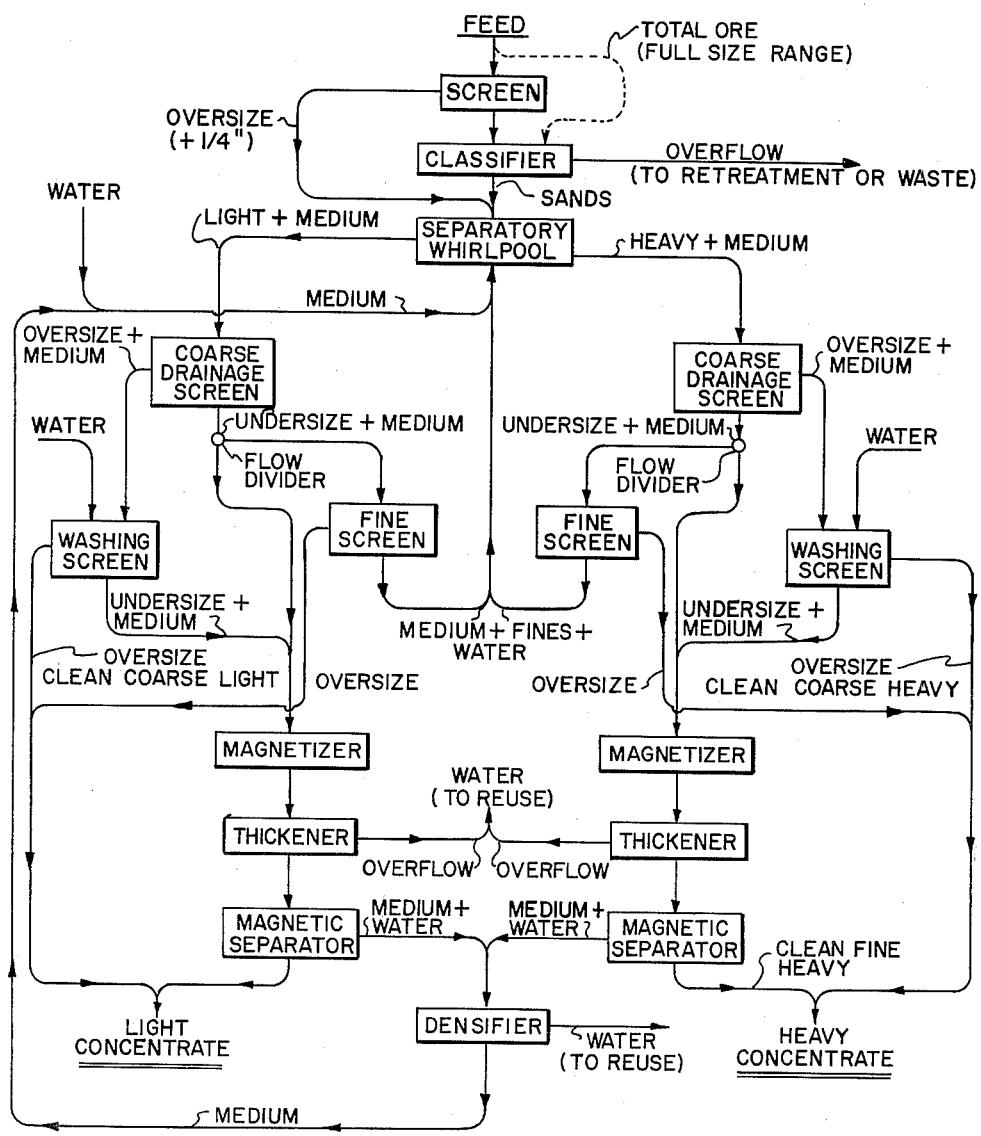
FIG. 3 represents a further modification in which the directly recycled portion is subjected to further screening.

FIG. 3 introduces a further modification. Instead of recirculating the portion of the drainage medium which is diverted by the flow dividers directly to the separatory whirlpool it is screened on finer screens than the drainage screens which separates medium from some of the fine products which are intermediate in size between the coarse drainage screen and the fine screen. By reason of the fact that the fine screens are handling only a portion of the flow it is possible to take still further load off the magnetic separators even though the capacity of the fine screens is not as great as that of the coarse ones. In FIG. 3 this additional separation of fine, light and heavy particles is shown as making possible a reduction in the number of magnetic separators.

In any given installation a proper number of magnetic separators will be determined by the requirements of the particular ore treatment. In each case the best compromise for maximum operating efficiency at minimum equipment cost will be chosen by the skilled, ore dressing engineer. The great flexibility which the process presents is a very definite practical advantage, the process being easily adaptable for maximum efficiency with a large number of wide size range feeds.

In the drawings magnetizers have been shown before each thickener. In practice this is normally desirable because by magnetizing the medium it clumps and settles very fast so that much smaller thickeners can be used. It should be understood, however, that the magnetizers do not change the process and the same results can be obtained, although at higher cost, by omitting the magnetizers and using much larger thickeners. Putting it another way magnetic thickening in most cases is a desirable plant design but it is not in any way essential to the operation of the present invention.

The invention has been described primarily in connection with the beneficiation of ores including coal. This constitutes the most important single field in which the invention can be used. However, it is not the only field. Some industrial waste such as different types of scrap present a separation problem where their specific gravities are sufficiently different. For example, fibers may be separated from rubber before reclaiming, separating undesired minerals from gravel, minerals from mineral mixtures, abrasives from metal scrap and the like. The separation is very sharp and in general permits separating particles that differ from each other by as little as 0.01 in specific gravity. Ordinarily this specific gravity difference is somewhat greater as the efficiency of any process using a separating medium increases with increased difference of specific gravity.

I claim:

1. In a continuous process of separating non-magnetic particles of different specific gravities from mixtures thereof, at least one of the constituents being present in a large size range; the combination of steps which comprises introducing the mixture into a single zone of whirling heavy density fluid, said fluid whirling to form two concentric vortices, and consisting of a suspension of finely divided magnetically susceptible material which, under the influence of centrifugal force, produces an apparent fluid density between the specific gravities of the material to be separated, collecting a light fraction from the inner vortex and a heavy fraction from the outer vortex, draining and washing substantially all of each fraction, subjecting substantially all of the underflow separately to at least one magnetic separation whereby magnetically susceptible material is separated from nonmagnetic material, recovering clean, light and heavy products and recirculating the magnetically cleaned magnetic solids to the whirling zone without demagnetization.

2. A process according to claim 1 in which the mixture of particles includes particles −10 plus 65 mesh.

3. A process according to claim 1 in which each of the fractions separated in the whirling medium is first screened on a screen much coarser than the finest particle sizes followed by washing, and a portion of the medium draining from the drainage screens is recycled to the whirling zone.

4. A process according to claim 3 in which the portion of the medium drained from each drainage screen and recycled is screened at a size intermediate the coarse screen and the finest particle size in the original mixture, the overflow from this latter screen is combined with the overflow of the washing screen to form part of the light concentrate and the portion of the underflow from the drainage screen which is not further screened is combined with the underflow from the washing screen and magnetically cleaned.

5. A process according to claim 1 in which the drainage and washings from the two fractions are magnetically thickened before magnetic separation.

References Cited in the file of this patent

UNITED STATES PATENTS

| | | |
|---|---|---|
| 2,496,590 | Marsh | Feb. 7, 1950 |
| 2,860,782 | Fontein | Nov. 18, 1958 |
| 2,932,395 | Marot | Apr. 12, 1960 |